(12) United States Patent
Morrison

(10) Patent No.: US 8,393,367 B1
(45) Date of Patent: *Mar. 12, 2013

(54) ENERGY EFFICIENT WHEEL PRODUCT

(76) Inventor: Glenn Arthur Morrison, Momence, IL (US)

( * ) Notice: Subject to any disclaimer, the term of this patent is extended or adjusted under 35 U.S.C. 154(b) by 376 days.

This patent is subject to a terminal disclaimer.

(21) Appl. No.: 12/800,943

(22) Filed: May 26, 2010

Related U.S. Application Data

(63) Continuation-in-part of application No. 11/769,566, filed on Jun. 27, 2007, now Pat. No. 7,726,371.

(51) Int. Cl.
*B60C 5/00* (2006.01)
*B60C 5/20* (2006.01)
*B60C 5/22* (2006.01)
*B60B 19/00* (2006.01)

(52) U.S. Cl. .................. 152/331.1; 152/450; 152/339.1; 301/5.1

(58) Field of Classification Search .............. 152/340.1, 152/5.1, 38.1, 39.1, 40.3; 301/40.4
See application file for complete search history.

(56) References Cited

U.S. PATENT DOCUMENTS

| 6,470,935 B1 * | 10/2002 | Fulsang | 152/339.1 |
| 6,516,845 B2 * | 2/2003 | Nguyen et al. | 152/158 |

FOREIGN PATENT DOCUMENTS

| GB | 2299554 | * 10/1996 |
| JP | 8-282208 | * 10/1996 |
| JP | 2006-231982 | * 9/2006 |

* cited by examiner

*Primary Examiner* — Justin Fischer

(57) ABSTRACT

The energy efficient wheel product substantially reduces energy loss due to tire flex and energy loss from a conventional automotive drive train. The wheel product includes an axis, a hub, two sidewalls, a low pressure inner chamber with shock absorbing hub protector, an outer ring with at least one high pressure pneumatic chamber with tread, and at least one restraint band radially restraining the outer ring to the hub. The hub can include an electric hub motor which rotates the hub, propelling the vehicle. The restraint band, sidewalls and pressurized chambers enable the wheel to simulate an energy efficient high pressure pneumatic wheel, experiencing little deformation when under smooth road conditions. When road conditions are rough, the band, sidewalls and outer chamber can temporarily buckle in response to the increased road forces, simulating a low pressure conventional tire having ample space for deformation. The low pressure chamber and hub protector provide built in suspension and shock absorption capability. The outer ring chamber can be filled with high pressure closed cell foam to prevent flats.

18 Claims, 3 Drawing Sheets

ENERGY EFFICIENT WHEEL PRODUCT

RELATED APPLICATIONS

This application is a Continuation In Part to application Ser. No. 11/769,566, filed Jun. 27, 2007 now U.S. Pat. No. 7,726,371.

FEDERALLY SPONSORED RESEARCH

Not Applicable

SEQUENCE LISTING OR PROGRAM

Not Applicable

FIELD OF INVENTION

The present invention relates to automotive wheels and, more particularly, to energy-efficient automotive wheels.

BACKGROUND

In the late 19th and early 20th centuries, automotive wheel design was based on that of bicycle tires having thin walls with high pressure and narrow profiles. The advantage of this, important at that time, was high energy efficiency with low energy loss due to tire flex. Disadvantages were a hard ride and frequent punctures. As time went on, engines became more powerful and fuel less expensive. Freedom from flats and ride comfort took top priority, leading to wider, lower pressure, thicker tires. These tires involved greater energy loss mainly due to tire flex at and near the area of contact with the road. Recently however, energy conservation has once again become of prime importance. The need for higher energy efficiency in the wheel, among other automotive subsystems, is paramount.

Under smooth road conditions, the ideal energy conserving tire has thin walls and is inflated to high pressure. The tire is supported by the rim which functions as a rigid support. A narrow high pressure bicycle tire is an example. A small amount of tire flex occurs at or near the road contact, causing minimal energy loss.

Under rough conditions with large road obstructions, shock absorption and cushioning are the major requirements which a low pressure, large chambered tire can satisfy. Conventional automotive tires meet these requirements well. These tires rely on a single inflated low pressure thick-walled air chamber for operation on both smooth and rough roads. Thus a conventional tire is largely biased towards cushioning on rough roads, while sacrificing the energy saving characteristics of narrow high pressure tires.

Past attempts have been made to design energy conserving multichambered tires. U.S. Pat. Nos. 4,293,017 and 5,109,905 (Lambe) disclose a two-chambered tire, with the goal of reducing tire flex and conserving energy. An outer high pressure tread chamber is intended to simulate a high pressure pneumatic tire. An inner low pressure chamber is intended to simulate a conventional low pressure tire with cushioning effect. However, Lambe's tire would provide at most a small improvement in efficiency over a conventional tire, for two reasons. Without internal restraint bands to position the outer chamber relative to the hub, a very high outer chamber pressure would be required to stiffen the tread sufficiently to adequately reduce tire flex both in the low pressure chamber and near the road contact. There is nothing present that enables simulation of the rigid support provided to a narrow high pressure tire by its rim. Also, even if the outer chamber were stiffened substantially, without internal restraint bands the outer chamber would not remain centered on the rotational axis; thus the sidewalls would flex to about the same extent as with a conventional tire. Much of the outer chamber would move vertically in response to a road obstruction, possibly leading to an actual reduction in efficiency. The outer chamber may have increased stiffness because of the high pressure, but the restoring force profile (i.e. the restoring force as a function of overall tire deformation) is similar to that of a conventional automotive tire. As a result, Lambe's tire cannot truly and effectively simulate a high pressure pneumatic tire on a smooth road.

References to multi-chambered tires for the purpose of reducing the effects of punctures occur, for example in U.S. Pat. No. 6,470,935 (Fulsang), U.S. Pat. No. 2,572,594 (Bushemi), and U.S. Pat. No. 580,884 (Murphy). These examples make no reference to energy saving features.

References to hub protectors exist, for example U.S. Pat. No. 7,100,654 (Boiocchi, et al), U.S. Pat. No. 5,885,383 (French), and U.S. Pat. No. 4,922,981 (Pompier). These devices serve to reduce damage to the hub and rim after a puncture, but are not designed to function as shock absorbers or as a component of suspensions.

The present device features a tire which meets the requirements for rough and smooth roads in such a manner that each of the two requirements comes into play only when required by the specific road condition. Thus each of the two requirements can be met separately and optimally. On a smooth road, an internal restraint band holds the outer high pressure chamber in a position concentric with the hub and axis. On a rough road, that part of the tire near the road contact buckles inward toward the hub, bringing the cushioning effect of the low pressure chamber and the hub protector into play. Additional reductions in energy consumption can be gained by incorporating an electric hub motor, which reduces or eliminates the need for the typical drive train implemented between the engine and the conventional wheel.

The previous attempts at producing a tire design combining the advantages of energy conservation on smooth roads and cushioning on rough roads have proven inadequate. The present device however, meets these requirements and more: (1) simulation of a high pressure pneumatic tire on smooth roads, (2) simulation of a cushioning effect of a conventional low pressure tire on rough roads, (3) functioning as a shock absorber and suspension on rough roads, and (4) safety features to mitigate the effect of punctures.

SUMMARY

The energy efficient wheel product is an automotive wheel for use with various ground vehicles. The product is designed to provide rolling support to the vehicle and to accommodate various surface conditions, for example, smooth pavement, rough pavement, potholes, dirt roads, and other conditions.

The wheel product includes a multi-chambered pneumatic tire designed to minimize energy loss between the tire and a rolling surface by substantially reducing tire flex, a main source of energy loss in ground vehicles. Additionally, the product can reduce the need for conventional drive train elements such as transmissions, suspensions and shock absorbers.

A pneumatic tire under load deforms to reduce a pressurized volume, thereby raising internal air pressure. When the internal air pressure is sufficient to balance the load, the vehicle is supported substantially by the air pressure, providing a flexible cushion between the vehicle and the rolling surface that absorbs shock and provides a comfortable ride. However, a conventional tire expends significant energy, mostly in the form of wasted heat, as it deforms while rolling over the surface.

The energy efficient wheel product utilizes a high-pressure chamber, and an inventive internal restraint that positions the chamber, to approximate a high pressure pneumatic tire when rolling on smooth surfaces. On smooth surfaces, the multi-chambered tire exhibits minimal energy loss due to tire flex. Over rough surfaces, the multi-chambered tire performs similarly to a low pressure conventional tire to provide additional cushioning needed for a comfortable ride.

OBJECTS OF THE INVENTION

It is therefore an object of the invention to reduce energy loss in automotive wheels due to tire flex.

It is another object of the invention to simulate an energy-efficient high pressure pneumatic tire on smooth roads.

It is another object of the invention to simulate a low pressure cushioning tire on rough roads, providing an internal suspension and shock absorber for ride comfort and to protect the hub.

It is another object of the invention to provide an internal suspension and shock absorber to reduce energy loss due to road-induced vertical motion of the wheel, to reduce need for external suspension.

It is another object of the invention to reduce energy loss due to a complex drive train by utilizing an electric hub motor.

It is another object of the invention to provide a flat-resistant tire.

DETAILED DESCRIPTION

The invention is an energy efficient wheel product. The product can be used on ground vehicles, including but not limited to automobiles, all-terrain vehicles, trailers, and various other rolling vehicles.

The wheel product 10 includes a multi-chambered pneumatic tire 20 fixed to a wheel hub 34. The multi-chambered tire can replace a conventional tire mounted to a wheel and can substitute for a conventional tire.

The multi-chambered tire rotates with the wheel hub about a wheel axis 35. The tire encircles the wheel hub and, in use, supports the wheel hub in spaced-apart relation from a rolling surface, for example from a roadway surface.

Figure 1:
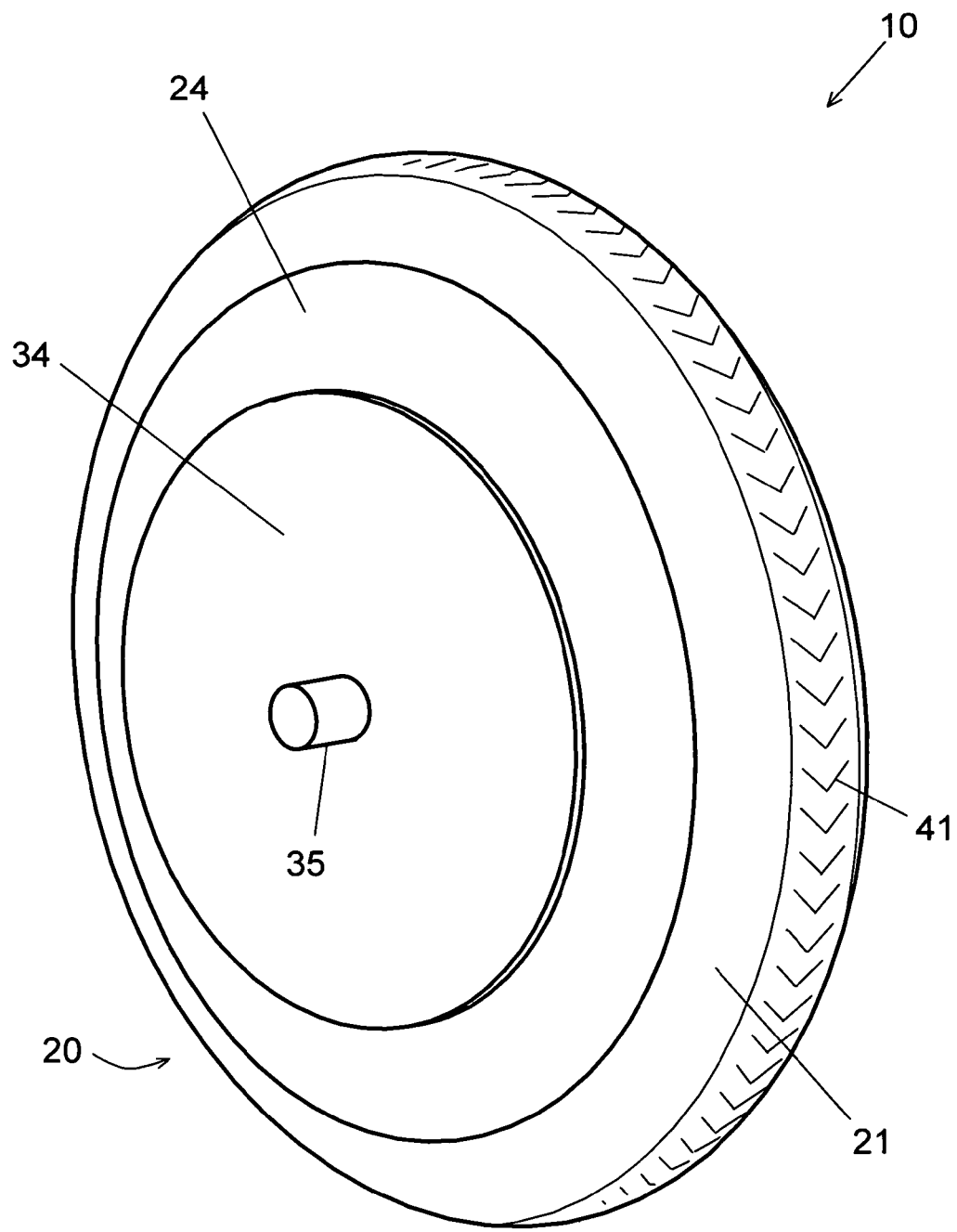
FIG. 1 is a perspective view of an embodiment of the present device.
Figure 2:
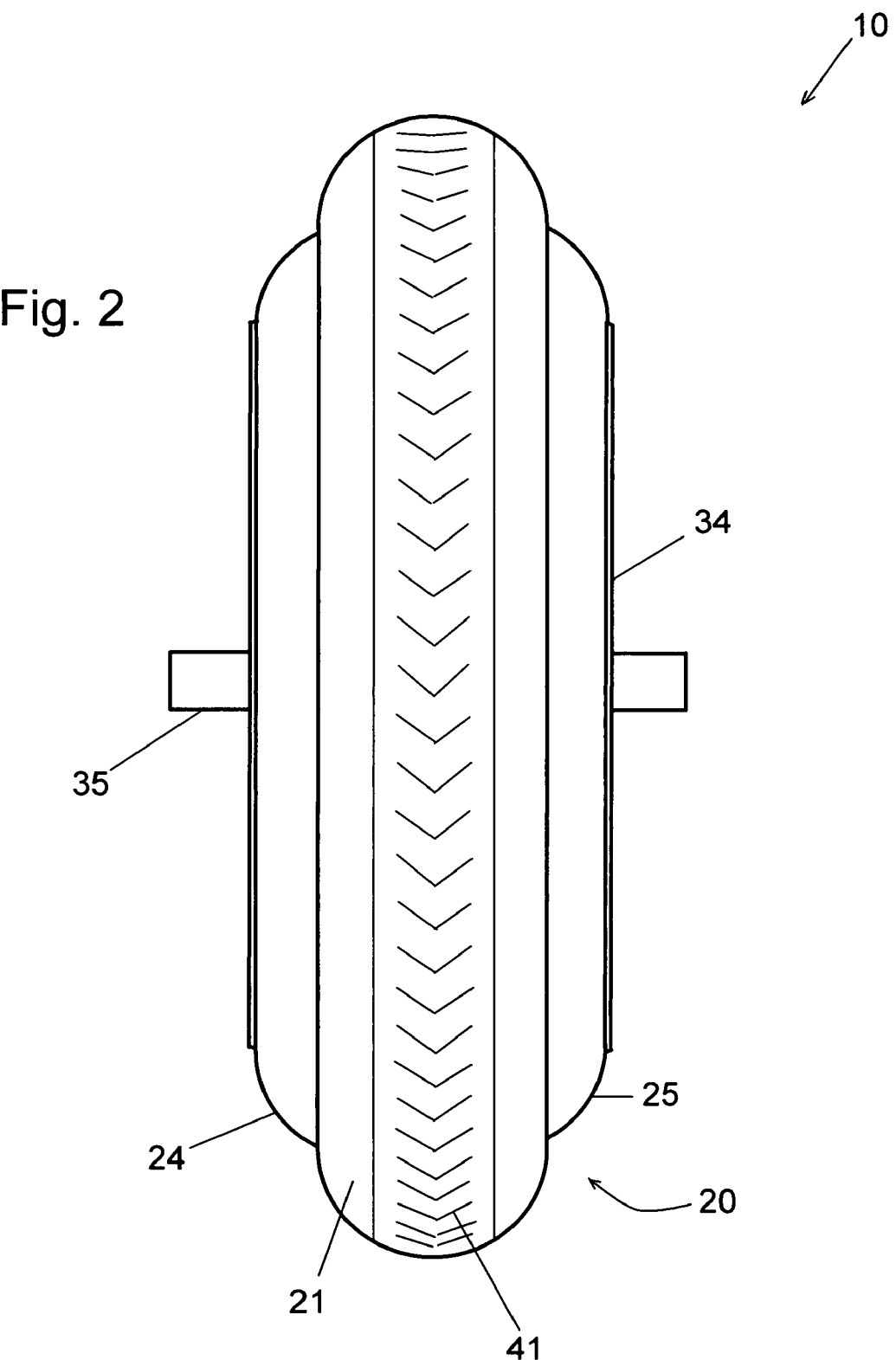
FIG. 2 is a front view of the embodiment.
Figure 3:
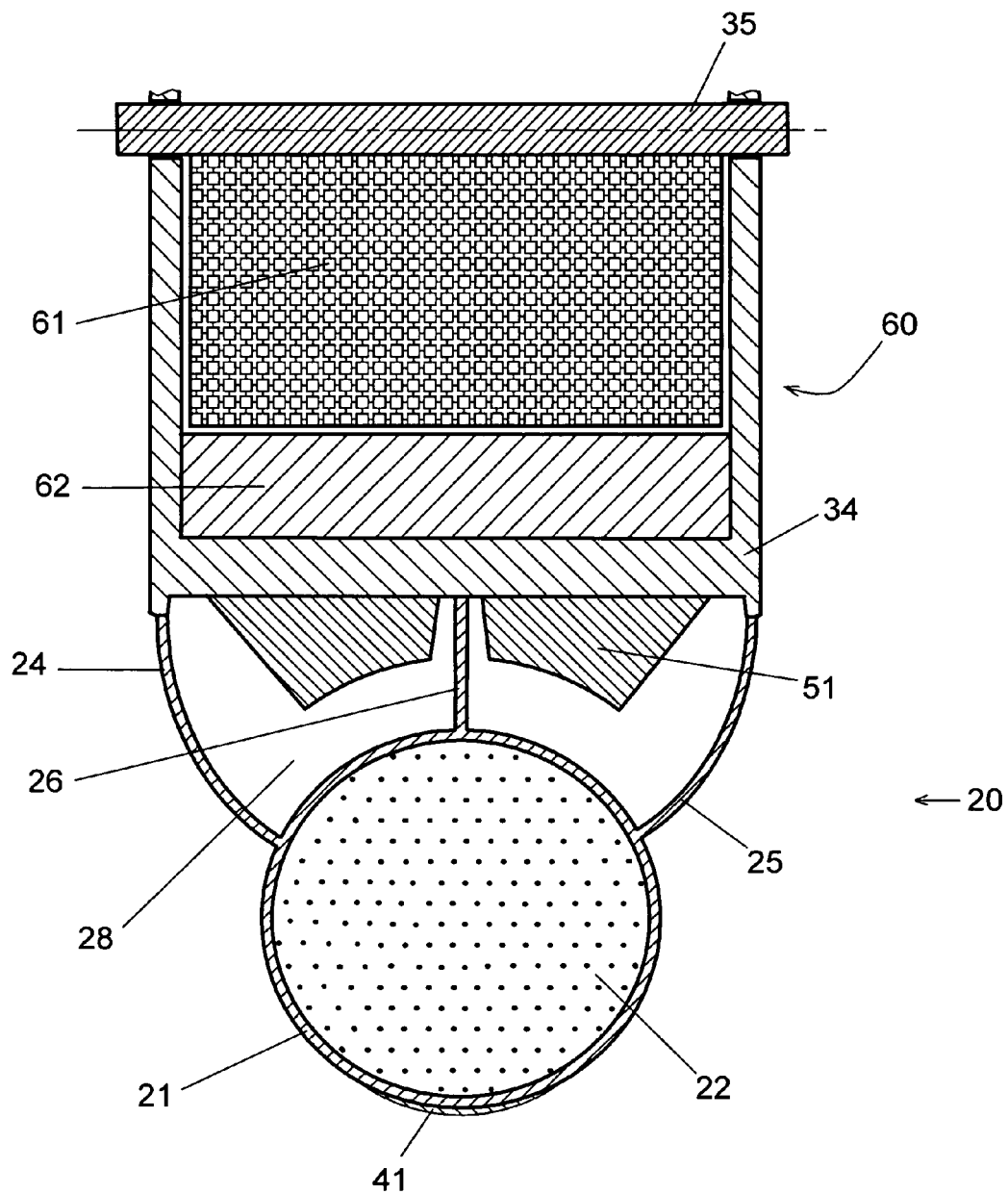
FIG. 3 is a section view of the embodiment along a plane parallel with the wheel axis and extending outward from the axis of rotation, including the wheel axis.

As shown in FIGS. 1-3, the wheel product 10 includes the multi-chambered pneumatic tire 20. The tire 20 encircles the wheel hub 34 for rotation about the wheel axis 35.

The tire has a non-porous outer ring 21. The outer ring encircles the wheel hub and is radially spaced apart from the wheel hub. The outer ring, in use, can contact the rolling surface.

The outer ring is connected to the wheel hub by a first non-porous sidewall 24 and a second non-porous sidewall 25. The sidewalls are each fixed to the wheel hub and each encircles the wheel hub. The sidewalls are axially spaced apart and each extends radially outwards from the wheel hub to connect to the outer ring.

The sidewalls and the outer ring are non-porous as required to maintain elevated pressures within the tire.

The outer ring is anchored to the wheel hub by at least one ring restraint band 26. The ring restraint band, or bands, encircles the hub and connects to the wheel hub or to the sidewalls near the hub. The ring restraint band may have a porous or meshed structure to allow for gas flow through the band, and to better resist shear forces to which the band may be subjected.

The ring restraint band positions the outer ring substantially concentrically to the wheel hub. The tire can include additional ring restraint bands, which help limit the outer ring's axial movement along the wheel hub. When one restraint band is used, the sidewalls are arranged more widely spaced so as to effectively limit the outer ring's axial movement.

The outer ring comprises at least one high-pressure chamber 22 that is pressurized with gas, for example with air. The high-pressure chamber forms a continuous, hollow chamber around the wheel hub. The high-pressure chamber, when pressurized, biases the outer ring to form a smoothly curving surface encircling the wheel hub.

The high-pressure chamber, in use and pressurized, can be substantially toroidally shaped. "Toroidal" and "torus", as used here and throughout, include elliptic tori and various similar shapes as well as circular tori.

The optimally pressurized high-pressure chamber stiffens the outer ring and helps hold the ring in a ring-like shape when under load. In addition, the high pressure of the stiffened outer ring minimizes rolling resistance by reducing tire flexing as the wheel product rolls along the surface.

In some embodiments, the high-pressure chamber can be filled with closed cell synthetic foam.

In FIGS. 1-3, the tire 20 has an outer ring 21 encircling the wheel hub 34. The ring 21 is connected to the wheel hub 34 by a first sidewall 24 and by a second sidewall 25. The outer ring 21 is positioned radially with respect to the wheel hub by at least one ring restraint band 26.

The outer ring 21 comprises at least one high-pressure chamber, for example the high-pressure chamber 22. The chamber can be substantially toroidal.

In use and rolling on a smooth surface, the stiffened outer ring and the ring restraint band work together to suspend the wheel hub so that the hub is positioned substantially concentrically within the ring and spaced apart from the surface.

Under load, the stiff outer ring resists deflecting from the ring-like shape and the ring restraint band holds the outer ring in position around the wheel hub. In combination, the outer ring and the ring restraint band or bands can approximate a solid wheel and therefore minimize energy loss as the wheel rolls on the smooth surface.

The ring restraint bands are strong, flexible, and substantially inelastic. The ring restraint bands minimally elongate so that the bands can significantly limit ring movement radially away from the hub and axially along the hub. Under load, the stiff outer ring contacts the rolling surface and the load biases the hub to move within the outer ring toward the road surface. At least part of the inelastic restraint band becomes tensioned between the hub and the outer ring and positions the hub substantially concentrically within the ring.

The ring restraint bands may be porous or have a meshlike structure to prevent pressure gradients across each ring restraint band. Except for transient pressure gradients, ring restraint band porosity ensures substantially equal pressure across the ring restraint bands. A second advantage of band porosity is an increased resistance to damage caused by shear forces within in the band.

The tire can have one or more additional ring restraint bands. A ring restraint band can intersect another ring restraint band. Ring restraint bands can be connected via various means and methods including, but not limited to, sewing, adhesive bonding, thermal welding, and others. Multiple ring restraint bands can be unitarily formed together.

The tire has a low-pressure chamber 28 bounded by the hub, the outer ring, and the sidewalls. The low-pressure chamber is substantially medial the hub and the outer ring and can provide pneumatic support if the outer ring collapses or if the outer ring loses pressure. The low-pressure chamber works together with the ring restraint bands and the outer ring stiffness to hold the outer ring in a substantially concentric position around the wheel hub.

In FIG. 3, the wheel product 10 has a low-pressure chamber 28.

Under load, rolling on a smooth surface and with optimal pressures in both the high-pressure chamber and the low-pressure chamber, the ring restraint band holds the stiff, pressurized outer ring substantially concentrically around the wheel hub.

Under load, rolling on a rough surface, and when the wheel product encounters a significant obstruction, part of the outer ring can collapse inwards towards the hub due to the flexibility of the high and low pressure chambers, the outer ring, and the ring restraint band or bands.

With part of the outer ring collapsed, the tire holds the wheel hub away from the rolling surface substantially via the low-pressure chamber maintaining a gap between the wheel hub and the rolling surface.

With the outer ring collapsed, the low-pressure chamber and the stiffness of the outer ring provide outward restoring forces biasing the outer ring to re-assume the ring-like shape and to hold the outer ring substantially concentrically around the wheel hub.

With part of the outer ring collapsed, the tire can perform like a conventional pneumatic tire.

The outer ring can have an outward-facing replaceable tread. The outward-facing replaceable tread can protect the outer ring from contacting directly the rolling surface. The replaceable tread tread can provide puncture resistance and wear resistance to the outer ring.

In FIGS. 1-3, the outer ring 21 has an outward-facing replaceable tread 41.

The outward-facing replaceable tread can be removable and replaceable. The replaceable tread can be connected to the outer ring via various means, including but not limited to adhesive means, sewing means, and various other connection means. The replaceable tread can be unitarily molded into the outer ring.

The tire can have a sidewall restraint band (not shown). The sidewall restraint band connects the sidewalls together and limits the sidewalls from moving away from each other. The sidewall restraint band can help maintain optimal tire shape by limiting sidewall movement. The sidewall restraint band connects to each sidewall and the band is spaced apart from both the wheel hub and from the outer ring, within the low-pressure chamber.

The sidewall restraint band may be porous to prevent pressure gradients across the sidewall restraint band. Except for transient pressure gradients, sidewall restraint band porosity provides substantially equal pressure across the sidewall restraint band, and increased resistance to damage caused by shear forces within in the band.

The sidewall restraint band is strong, flexible, and substantially inelastic. The sidewall restraint band minimally elongates so that the band can significantly limit ring movement radially away from the hub and axially along the hub.

The sidewall restraint band maintains the optimal tire shape by keeping the sidewalls from bulging outwards under load and pressure. The optimal shape can promote maximum tread contact with the rolling surface and minimize sidewall scrubbing on the rolling surface. The narrow shape imposed by the sidewall restraint band can also reduce aerodynamic drag caused by the tire.

The sidewall restraint band substantially bisects the low-pressure chamber. The sidewall restraint band can intersect a ring restraint band. The sidewall restraint band can be connected to the ring restraint band and can be unitarily formed with the ring restraint band.

The tire can have more than one sidewall restraint band. A sidewall restraint band can intersect another sidewall restraint band. Sidewall restraint bands can be connected via various means and methods including, but not limited to, sewing, adhesive bonding, thermal welding, and others. Multiple sidewall restraint bands can be unitarily formed together.

The wheel product can include at least one hub protector 51 in the form of a ring or rings encircling the hub within the low-pressure chamber. The hub protector can protect the hub from damage in the event of significant pressure loss in both the high-pressure chamber and the low-pressure chamber, and when the outer ring has been substantially deformed by road obstructions. After a significant pressure loss and after substantial outer ring deformation, the wheel product can roll on the hub protector without damaging the hub, for a limited time.

Additionally, the hub protector absorbs shock in the event of a significant pressure loss and in the event of substantial outer ring deformation. The hub protector can absorb shock by converting energy expended deforming the hub protector into heat.

In FIG. 3, the wheel product 10 has two hub protectors 51.

The hub protector can have various shapes. The hub protector 51 may have a polygonal cross-section, a curvilinear cross-section, or arbitrarily shaped cross-section. The hub protector can be made of polymer or other semi-resilient material. In some embodiments, the hub protector may occupy the entire space of the low pressure chamber, except for the ring restraint band or bands.

In an embodiment of the invention, the wheel product incorporates an electric hub motor 60 built directly into the wheel hub so that the wheel product provides a self-contained propulsion system. The hub motor embodiment allows for further reduction in the number and complexity of drive train components such as a drive shaft, universal joints, CV joints, and various other elements. This embodiment significantly enhances the overall efficiency of the wheel product.

The hub motor comprises an internal stator 61 and a driven, external rotor 62 fixed to the wheel hub. As electromagnetic fields are introduced in the stator, the rotor and the wheel hub follow the fields and drive the wheel hub in rotation around the stator.

The hub motor embodiment of the wheel product includes the multi-chambered pneumatic tire fixed to and rotating with the wheel hub.

In FIG. 3, the wheel product 10 has an electric hub motor 60 built into the wheel hub 34. The hub motor comprises an internal stator 61 and a rotor 62 connected to the wheel hub 34. For long life, the electric hub motor may be of a brushless type designed for operation with a voltage controller.

At low speeds, ohm losses in the windings of a hub motor without gear reduction become large compared to the mechanical output power, causing loss of efficiency. For this reason the hub motor may be provided with a planetary gear reduction system (not shown) to enable the electric motor to run at a higher, more efficient speed, while providing a lower rotation speed to the hub and tire.

The advantages of the planetary gear system are higher torque at all speeds, moderate to good efficiency at low speeds, and the possibility of shifting between different gear ratios. In conventional planetary gear systems, when gear teeth and rollers mesh, their surfaces are in relative motion, thus creating friction and energy loss. Bicycle chains reduce this problem by using rollers whose surfaces contact the sprocket teeth while rotating on their lubricated cores to reduce relative surface motion of roller and tooth. The relative motion takes place between the roller and its core, separated by a layer of lubrication which prevents actual contact, greatly reducing friction. The teeth of the hub motor's planetary gears can be replaced with roller bearings of the type used in bicycle chains, and the teeth of the inner and outer gears are replaced with teeth of the type used in bicycle sprockets, that will properly mesh with the rollers. To reduce friction even further, the gear rollers themselves may have ball bearings. Energy loss due to gear tooth friction should be substantially reduced and service life should be correspondingly increased.

The wheel hub may incorporate an electronically controlled automatic air pressure regulator (not shown) to control gas pressure in the low pressure chamber and hub protector. This enables the low pressure in the hub protector to act as an adjustable "trimmer" restoring force in addition to the restoring force provided by the stiffness of the sidewalls and outer ring. The wheel may have disc brakes (not shown). The discs may be attached to the rotating outer hub and the shoes may be attached to the stationary wheel axis. The disc brakes may serve as a backup for regenerative braking when the wheel is used in an electric or hybrid vehicle.

A replaceable tread 41 may be attached to the external surface of the outer ring 21. The replaceable tread may be made of rubber, high resiliency urethane or other material. It may be belted with poly-para-phenylene terephthalamide or similar material for longer wear. The replaceable tread protects the outer ring from road wear and prolongs its life. Attachment methods such as beads, adhesive cement or vulcanization may secure the replaceable tread to the outer ring.

CONCLUSION

The widespread use of electric vehicles has been impractical in the past for two main reasons. The primary obstacle is lack of range due to inadequate battery capacity. However, even if battery capacity were adequate, the charging of these vehicles would severely tax household power circuits and in turn the entire electrical grid if implemented on a mass scale. The aging US power grid has difficulty satisfying increasing demand as it is. If electric vehicles are to serve as a serious alternative to fossil fueled cars then a large increase in electric vehicle efficiency and range is clearly necessary. An automobile that not only has zero carbon emission as in electric vehicles, but is highly energy efficient, would be desirable. Combining the energy efficient wheel product with existing automotive technologies should bring this goal within reach in the near future.

The energy efficient wheel product can be implemented on many different types of vehicles. The Neighborhood Electric Vehicle (NEV) is one concept that can work well with the wheel product. An electric propulsion system for the NEV may consist of four wheel units plus battery and a voltage control unit for each wheel. Rechargeable batteries (e.g. lithium ion, magnesium-water fuel cell or zinc-air fuel cell) supplemented by surface-mounted photovoltaic charger cells may provide power. For a 600 kg vehicle on a smooth level road with aerodynamic drag coefficient of 0.2, this combination of features may provide a range of approximately 16 km per kilowatt-hour at a speed of 30 km/h, and 9 km per kwh at 50 km/h. A 150 kg battery with energy storage density of 200 watt-hours per kilogram should provide a range of approximately 600 km at 30 km/h. Even an inexpensive lead-acid deep cycle battery should provide 120 to 160 km range with such a vehicle. Added benefits of the present device, if used on a mass scale, are reductions in greenhouse gas emissions, and significant reduction in global oil consumption.

Although the above description contains many details, these should not be construed as limiting the scope of the embodiments but as describing only one of many possible embodiments.

The invention claimed is:

1. An energy efficient wheel product comprising:
a multi-chambered pneumatic tire fixed to and rotating with a wheel hub about a wheel axis;
the tire comprising:
a hollow non-porous outer ring encircling the wheel hub and being radially spaced apart from the wheel hub;
the outer ring comprising:
at least one high-pressure chamber;
the at least one high-pressure chamber encircling the wheel hub within the outer ring;
the outer ring being fixed to the hub by a first non-porous sidewall and by a second non-porous sidewall, the sidewalls being axially spaced apart;
the outer ring, first and second sidewalls, and wheel hub enclosing a low pressure chamber;
the outer ring being restrained radially to the wheel hub by at least one ring restraint band; the at least one ring restraint band encircling the hub within the low pressure chamber, the at least one ring restraint band being substantially inelastic;
the outer ring contacting a rolling surface.

2. The wheel product of claim 1 wherein the at least one high-pressure chamber comprises a closed cell synthetic foam.

3. The wheel product of claim 2 further comprising at least one hub protector encircling the hub within the low-pressure chamber.

4. The wheel product of claim 1 further comprising at least one hub protector encircling the hub within the low-pressure chamber.

5. An energy efficient wheel product comprising:
an electric hub motor,
the hub motor having a wheel hub driven in rotation about a wheel axis;
a multi-chambered pneumatic tire fixed to and rotating with the wheel hub about the wheel axis;
the tire comprising:
a hollow non-porous outer ring encircling the wheel hub and being radially spaced apart from the wheel hub;
the outer ring comprising:
at least one high-pressure chamber;
the at least one high-pressure chamber encircling the wheel hub within the outer ring;
the outer ring being fixed to the hub by a first non-porous sidewall and by a second non-porous sidewall, the sidewalls being axially spaced apart;

the outer ring, first and second sidewalls, and wheel hub enclosing a low pressure chamber;

the outer ring being restrained radially to the wheel hub by at least one ring restraint band; the at least one ring restraint band encircling the hub within the low pressure chamber, the at least one ring restraint band being substantially inelastic;

the outer ring contacting a rolling surface.

6. The wheel product of claim 5 wherein the at least one high-pressure chamber comprises a closed cell synthetic foam.

7. The wheel product of claim 6 further comprising at least one hub protector encircling the hub within the low-pressure chamber.

8. The wheel product of claim 5 further comprising at least one hub protector encircling the hub within the low-pressure chamber.

9. An energy efficient wheel product comprising:
a multi-chambered pneumatic tire fixed to and rotating with a wheel hub about a wheel axis;
the tire comprising:
a hollow non-porous outer ring encircling the wheel hub and being radially spaced apart from the wheel hub;
the outer ring comprising:
at least one high-pressure chamber;
the at least one high-pressure chamber encircling the wheel hub within the outer ring;
a replaceable tread, attached at a radially outer surface of the outer ring, for extending the life of the outer ring;
the outer ring being fixed to the hub by a first non-porous sidewall and by a second non-porous sidewall, the sidewalls being axially spaced apart;
the outer ring, first and second sidewalls, and wheel hub enclosing a low pressure chamber;
the outer ring being restrained radially to the wheel hub by at least one ring restraint band; the at least one ring restraint band encircling the hub within the low pressure chamber, the at least one ring restraint band being substantially inelastic;
the outer ring contacting a rolling surface.

10. The wheel product of claim 9 wherein the replaceable tread comprises poly-para-phenylene terephthalamide fibers.

11. The wheel product of claim 10 further comprising at least one hub protector encircling the hub within the low-pressure chamber.

12. The wheel product of claim 9 further comprising at least one hub protector encircling the hub within the low-pressure chamber.

13. The wheel product of claim 9 wherein the at least one high-pressure chamber comprises a closed cell synthetic foam.

14. An energy efficient wheel product comprising:
an electric hub motor,
the hub motor having a wheel hub driven in rotation about a wheel axis;
a multi-chambered pneumatic tire fixed to and rotating with the wheel hub about the wheel axis;
the tire comprising:
a hollow non-porous outer ring encircling the wheel hub and being radially spaced apart from the wheel hub;
the outer ring comprising:
at least one high-pressure chamber;
the at least one high-pressure chamber encircling the wheel hub within the outer ring;
a replaceable tread, attached at a radially outer surface of the outer ring, for extending the life of the outer ring;
the outer ring being fixed to the hub by a first non-porous sidewall and by a second non-porous sidewall, the sidewalls being axially spaced apart;
the outer ring, first and second sidewalls, and wheel hub enclosing a low pressure chamber;
the outer ring being restrained radially to the wheel hub by at least one ring restraint band; the at least one ring restraint band encircling the hub within the low pressure chamber, the at least one ring restraint band being substantially inelastic;
the outer ring contacting a rolling surface.

15. The wheel product of claim 14 wherein the replaceable tread comprises poly-para-phenylene terephthalamide fibers.

16. The wheel product of claim 15 further comprising at least one hub protector encircling the hub within the low-pressure chamber.

17. The wheel product of claim 14 further comprising at least one hub protector encircling the hub within the low-pressure chamber.

18. The wheel product of claim 14 wherein the at least one high-pressure chamber comprises a closed cell synthetic foam.

* * * * *